(12) United States Patent
Ihara et al.

(10) Patent No.: US 7,388,967 B2
(45) Date of Patent: Jun. 17, 2008

(54) VEHICLE RUNNING STATE JUDGING APPARATUS

(75) Inventors: Toru Ihara, Tokyo (JP); Keiichi Yamamoto, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 487 days.

(21) Appl. No.: 11/091,358

(22) Filed: Mar. 28, 2005

(65) Prior Publication Data

US 2005/0232464 A1  Oct. 20, 2005

(30) Foreign Application Priority Data

Mar. 26, 2004 (JP) ............... 2004-092922

(51) Int. Cl.
*G06K 9/00* (2006.01)
*G08B 23/00* (2006.01)
*G06F 17/00* (2006.01)
*G06F 17/10* (2006.01)
*G01C 21/00* (2006.01)
*G06G 7/78* (2006.01)

(52) U.S. Cl. ............ 382/104; 382/153; 340/576; 701/28; 701/200; 701/301

(58) Field of Classification Search ............... 382/104, 382/153, 100; 340/575, 576; 701/23–28, 701/96, 200, 300–301
See application file for complete search history.

(56) References Cited

U.S. PATENT DOCUMENTS

| | | | |
|---|---|---|---|
| 4,471,825 A * | 9/1984 | Kuhn et al. ............ | 152/209.18 |
| 4,482,136 A * | 11/1984 | Wolf et al. ............ | 267/152 |
| 4,496,938 A | 1/1985 | Seko et al. | |
| 4,868,752 A * | 9/1989 | Fujii et al. ............ | 701/28 |
| 4,954,962 A * | 9/1990 | Evans et al. ............ | 701/28 |
| 5,172,317 A * | 12/1992 | Asanuma et al. ............ | 701/28 |

(Continued)

FOREIGN PATENT DOCUMENTS

DE  3613669 A  * 10/1987

(Continued)

OTHER PUBLICATIONS

Tracking highly maneuverable targets with unknown behavior,Schell, C.; Linder, S.P.; Zeider, J.R.; Proceedings of the IEEE, vol. 92, Issue 3, Mar. 2004 pp. 558-574, Digital Object Identifier 10.1109/JPROC.2003.823151.*

(Continued)

*Primary Examiner*—Bhavesh M. Mehta
*Assistant Examiner*—Manav Seth
(74) *Attorney, Agent, or Firm*—Rossi, Kimms & McDowell LLP

(57) ABSTRACT

A vehicle running state judging apparatus calculates the edge detecting position of the first pixel group detected by the first gray value detection section, the edge detecting position of the second pixel group based on the gray value at that position, and the gray value at that position and judges meandering of a vehicle by comparing the edge detecting position of the second pixel group detected by the second gray value detection section and the gray value at that position, with the edge detecting position of the second pixel group calculated by the calculation section and the gray value at that position.

6 Claims, 3 Drawing Sheets

U.S. PATENT DOCUMENTS

| | | | |
|---|---|---|---|
| 5,648,755 A | | 7/1997 | Yagihashi |
| 5,685,925 A | * | 11/1997 | Riquier et al. ............... 152/157 |
| 5,694,116 A | | 12/1997 | Kojima |
| 5,745,031 A | * | 4/1998 | Yamamoto ................... 340/439 |
| 5,815,070 A | | 9/1998 | Yoshikawa |
| 5,974,792 A | * | 11/1999 | Isobe .......................... 60/278 |
| 6,023,227 A | | 2/2000 | Yanko et al. |
| 6,184,781 B1 | * | 2/2001 | Ramakesavan ............. 340/435 |
| 6,218,947 B1 | | 4/2001 | Sutherland |
| 6,285,778 B1 | * | 9/2001 | Nakajima et al. ........... 382/104 |
| 6,366,207 B1 | | 4/2002 | Murphy |
| 6,523,591 B1 | * | 2/2003 | Billieres et al. ............. 152/548 |
| 6,831,591 B2 | | 12/2004 | Horibe |
| 6,845,172 B2 | | 1/2005 | Furusho |
| 6,879,890 B2 | | 4/2005 | Matsumoto et al. |
| 6,925,206 B2 | | 8/2005 | Akutagawa |
| 6,950,027 B2 | | 9/2005 | Banas |
| 6,973,380 B2 | | 12/2005 | Tange et al. |
| 7,006,667 B2 | * | 2/2006 | Akutagawa ................. 382/104 |
| 7,054,723 B2 | | 5/2006 | Seto et al. |
| 7,084,772 B2 | | 8/2006 | Oyama |
| 7,152,000 B2 | * | 12/2006 | Ihara et al. .................. 701/301 |
| 7,190,274 B2 | * | 3/2007 | Ihara et al. .................. 340/575 |
| 7,204,130 B2 | * | 4/2007 | Koram et al. ................... 73/73 |
| 2002/0042676 A1 | * | 4/2002 | Furusho ....................... 701/300 |
| 2002/0061123 A1 | * | 5/2002 | Akutagawa ................. 382/104 |
| 2004/0080449 A1 | * | 4/2004 | Horibe ......................... 342/70 |
| 2005/0203706 A1 | | 9/2005 | Ihara et al. |

FOREIGN PATENT DOCUMENTS

| | | | |
|---|---|---|---|
| DE | 20016384 U1 | * | 2/2001 |
| DE | 59410156 G | * | 8/2002 |
| EP | 73299 B | * | 1/1986 |
| EP | 73966 B | * | 1/1986 |
| EP | 354562 A2 | * | 2/1990 |
| EP | 354562 B1 | * | 6/1997 |
| EP | 1053111 B1 | * | 1/2002 |
| EP | 1802496 A1 | * | 7/2007 |
| JP | 06-274786 A | | 9/1994 |
| JP | 2830475 B2 | | 9/1998 |
| JP | 10334393 A | * | 12/1998 |
| JP | 11013038 A | * | 1/1999 |
| JP | 11230273 A | * | 8/1999 |
| JP | 3039327 B2 | | 3/2000 |
| JP | 2001289029 A | * | 10/2001 |
| JP | 2002325347 A | * | 11/2002 |
| JP | 3635403 B2 | * | 4/2005 |
| JP | 2005146862 A | * | 6/2005 |
| JP | 2005258936 A | * | 9/2005 |
| KR | 490164 B | * | 5/2005 |
| WO | WO95/18433 A1 | | 7/1995 |
| WO | WO 9925572 A1 | * | 5/1999 |
| WO | WO 2006042248 A1 | * | 4/2006 |

OTHER PUBLICATIONS

The dynamic window approach to collision avoidance, Fox, D.; Burgard, W.; Thrun, S. Robotics & Automation Magazine, IEEE☐☐vol. 4, Issue 1, Mar. 1997 pp. 23-33, Digital Object Identifier 10.1109/100.580977.*

A co-evolution approach to sensor placement and control design for robot obstacle avoidanceWang, X.; Yang, S.X.; Weiren Shi; Meng, M.Q.-H.;Information Acquisition, 2004. Proceedings. International Conference on21-25 Jun. 2004 pp. 107-112, Digital Object Identifier 10.1109/ICIA.2004.1373331.*

Understanding the motions of tools and vehicles, Duric, Z.; Rivlin, E.; Rosenfeld, A.; Computer Vision, 1998. Sixth International Conference on, Jan. 4-7, 1998 pp. 925-932, Digital Object Identifier 10.1109/ICCV.1998.710827.*

A "constrain and move" approach to distributed object manipulation, Ahmadabadi, M.N.; Nakano, E.; Robotics and Automation, IEEE Transactions on, vol. 17, Issue 2, Apr. 2001 pp.157-172, Digital Object Identifier 10.1109/70.928561.*

The active recovery of 3D motion trajectories and their use in prediction, Bradshaw, K.J.; Reid, I.D.; Murray, D.W.; Pattern Analysis and Machine Intelligence, IEEE Transactions on, vol. 19, Issue 3, Mar. 1997 pp. 219-234 Digital Object Identifier 10.1109/34.584099.*

The use of optical flow for road navigation, Giachetti, A.; Campani, M.; Torre, V.; Robotics and Automation, IEEE Transactions on, vol. 14, Issue 1, Feb. 1998 pp. 34-48, Digital Object Identifier 10.1109/70.660838.*

Vehicle detection by means of stereo vision-based obstacles features extraction and monocular pattern analysis, Toulminet, G.; Bertozzi, M.; Mousset, S.; Bensrhair, A.; Broggi, A.; Image Processing, IEEE Transactions on, vol. 15, Issue 8, Aug. 2006 pp. 2364-2375, Digital Object Identifier 10.1109/TIP.2006.875174.*

A decision network based frame-work for visual off-road path detection problem, Broggi, A.; Caraffi, C.; Cattani, S.; Fedriga, R.I.; Intelligent Transportation Systems Conference, 2006. ITSC '06. IEEE, 2006 pp. 951-956, Digital Object Identifier 10.1109/ITSC.2006.1706867.*

Multilevel- and neural-network-based stereo-matching method for real-time obstacle detection using linear cameras, Ruichek, Y.; Intelligent Transportation Systems, IEEE Transactions on, vol. 6, Issue 1, Mar. 2005 pp. 54-62, Digital Object Identifier 10.1109/TITS.2004.838185.*

A voting stereo matching method for real-time obstacle detection, Hariti, M.; Ruichek, Y.; Koukam, A.; Robotics and Automation, 2003. Proceedings. ICRA '03. IEEE International Conference on, vol. 2, Sep. 14-19, 2003 pp. 1700-1704 vol. 2 ☐☐.*

A fast stereo matching method for real time vehicle front perception with linear cameras, Hariti, M.; Ruichek, Y.; Koukam, A.; Intelligent Vehicles Symposium, 2003. Proceedings. IEEE, Jun. 9-11 2003 pp. 247-252, Digital Object Identifier 10.1109/IVS.2003.1212917.*

Kitajima, H. et al., "Prediction of Automobile Driver Sleepiness," Transactions of the Japan Society of Mechanical Engineers, Sep. 1997, No. 96-1780, pp. 93-100.

Chinese Office Action issued Feb. 9, 2007, in Chinese Patent Application No. 200510054746.1, which is the counterpart of related co-pending U.S. Appl. No. 11/076,435, published as USPGP 2005-0203706A1.

Y. Ninomiya et al., "A real-time vision for intelligent vehicles," IEEE, Sep. 25-26, 1995, Proceedings of the Intelligent Vehicles 95 Symposium; pp. 315-320.

German Office Action issued in corresponding German Patent Application No. 10 2005 011 688.4-53, dated May 24, 2007.

* cited by examiner

VEHICLE RUNNING STATE JUDGING APPARATUS

CROSS-REFERENCE TO RELATED APPLICATIONS

This application is based upon and claims the benefit of priority from prior Japanese Patent Application No. 2004-092922, filed Mar. 26, 2004, the entire contents of which are incorporated herein by reference.

BACKGROUND OF THE INVENTION

1. Field of the Invention

The present invention relates to a vehicle running state judging apparatus which judges whether a driver has lost consciousness and fallen asleep at the wheel.

2. Description of the Related Art

Recently, as the road network has developed and leisure hours have increased, the opportunity to drive a car has increased. A driver is required to keep mental and physical health while driving. However, there may be a case of driving a car in poor health. In such a case, if a driver drives continuously or for a long time, the driver may fall asleep when fatigued and having lost concentration.

To prevent the above state, a camera is mounted on a vehicle to monitor the view in front of the vehicle, recognize a white road line to check meander driving, detect falling asleep, and warn against being asleep at the wheel. (Refer to the U.S. Pat. No. 3,039,327.)

According to the above system, the camera capture the running zone line on a road and judges meander driving based on that image. There is another method of judging meander driving by recognizing a white line on both sides of a road. However, in this method, if there is no while line on both sides of the road or snow is accumulated on the whole surface of a road, it is impossible to judge meander driving.

BRIEF SUMMARY OF THE INVENTION

It is an object of the present invention to provide a vehicle running state judging apparatus which can judge meander driving even if there is no white line on a road.

According to an aspect of the present invention, there is provided a vehicle running state judging apparatus comprising;

a camera which captures an image of a road surface in a vehicle running direction; and a meander state detection section configured to obtain the amount of meandering based on the road surface image captured by the camera, wherein the meander state detection section is comprised of:

a first gray value detection section configured to detect the edge of a gray value of a first pixel group arrayed in the horizontal direction out of the road surface images captured by the camera, and to detect the gray value at the edge detecting position;

a second gray value detection section configured to detect the edge of a gray value of a second pixel group arrayed in the horizontal direction out of the road surface images, and to detect the gray value at the edge detecting position;

a calculation section configured to calculate the edge detecting position of the first pixel group detected by the first gray value detection section, the edge detecting position of the second pixel group based on the gray value at that position, and the gray value at that position; and a judging section configured to for judge meandering of a vehicle by comparing the edge detecting position of the second pixel group detected by the second gray value detection section and the gray value at that position with the edge detecting position of the second pixel group calculated by the calculation section and the gray value at that position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
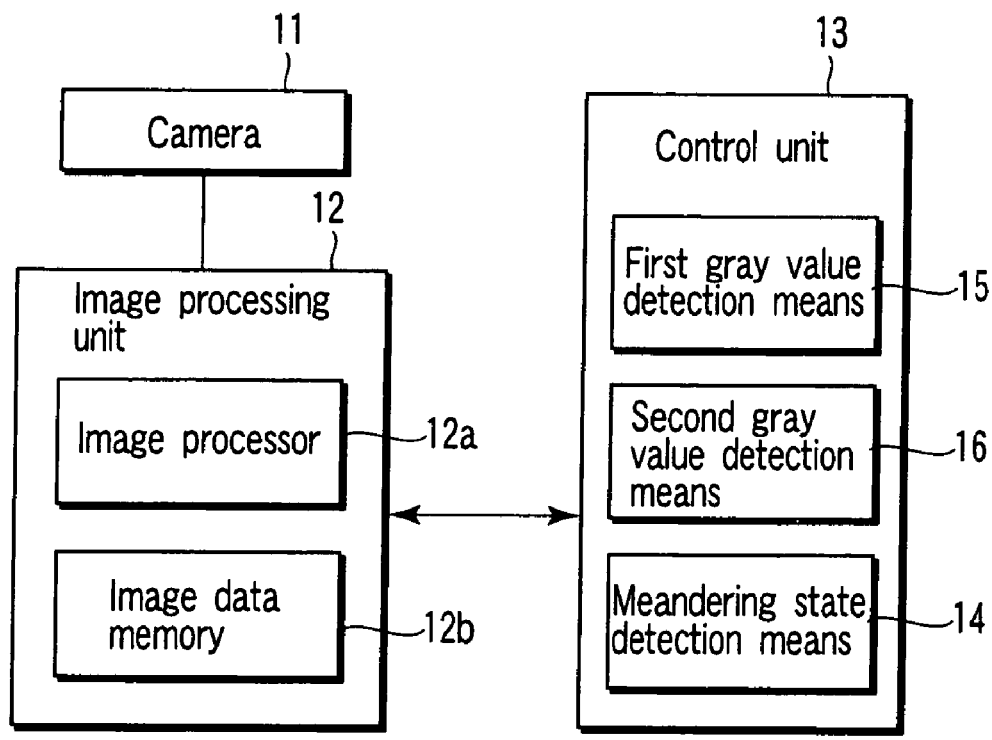
FIG. 1 is a block diagram for explaining a vehicle running state judging apparatus according to an embodiment of the present invention.

Hereinafter an embodiment of the present invention will be explained with reference to the accompanying drawings. FIG. 1 is a block diagram for explaining a vehicle running state judging apparatus. In FIG. 1, a reference numeral 11 denotes a CCD camera. The image of a road in front of a vehicle captured by the camera 11 is input to an image processing unit 12. The image processing unit 12 has an image processor 12a to process the image captured by the camera all, and an image data memory 12b to store the image data processed by the image processor 12a.

The image processing unit 12 is connected to a control unit 13. The control unit 13 consists mainly of a microprocessor, and includes a meander state judging means 14, a first gray value detection means 15 and a second gray value detection means 16.

Figure 2:
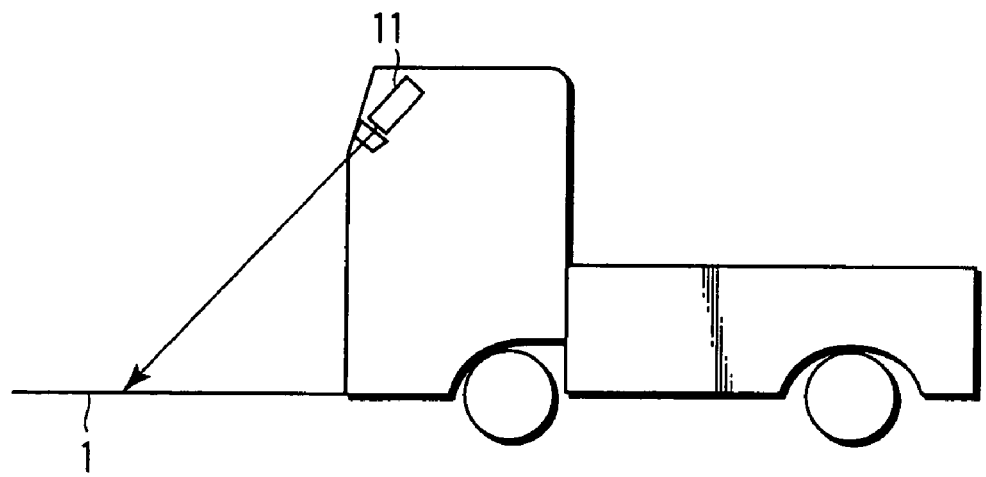
FIG. 2 is a view showing a position of mounting a camera of the vehicle running state judging apparatus of the same embodiment.
Figure 5:
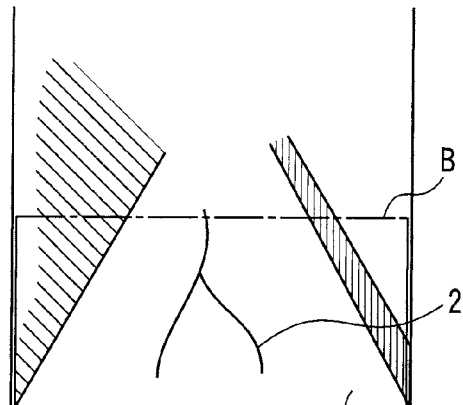
FIG. 5 a view showing the image in front of a vehicle captured by the camera mounted on the vehicle.

The camera 11 is mounted in the upper part of the center of the cabin of a vehicle, as shown in FIG. 2. The camera 11 captures an image of a road surface 1 in front of the vehicle running direction. FIG. 5 shows the image captured by the camera.

Figure 3:
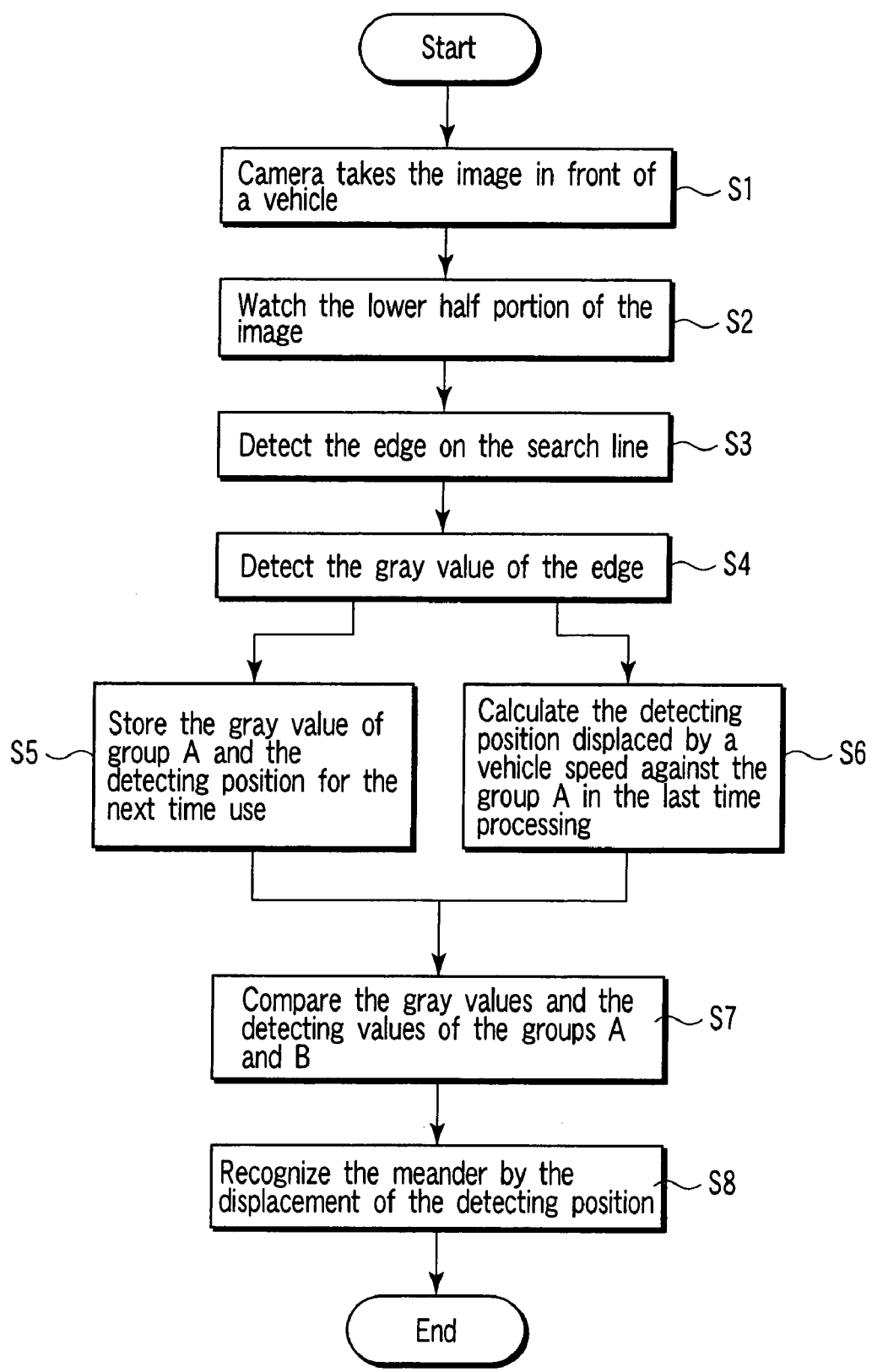
FIG. 3 is a flowchart for explaining the operation of the same embodiment.

Now explanation will be given on the operation of the embodiment of the present invention configured as above by referring to the flowchart of FIG. 3.

Figure 4:
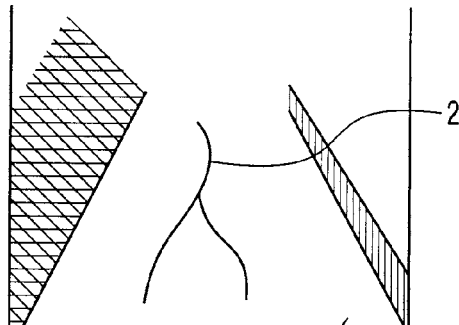
FIG. 4 is a view showing the image in front of a vehicle captured by the camera mounted on the vehicle.

First, an image in front of a vehicle is taken by the camera 11. The road image captured by the camera 11 is input to the image processing unit 12 (step S1). In this embodiment, the road has no white line on either side of the road surface 1 and has cracks 2 in the road surface, as shown in FIG. 4. The road surface image captured by the camera 11 is automatically recognized by the CCD. In this embodiment, the COD provides an image of 512×512 pixels. Watch the lower half portion B of the road surface image shown in FIG. 5 taken by the camera 11 (step S2). Because, the image resolution of the front side of the road surface image is high, and enables judgment of meander driving with high accuracy.

Assuming the horizontal direction of the CCD to be an X-axis and the vertical direction to be a y-axis, calculate the gray value on the three pixel groups $y_1, Y_2, Y_3$ arrayed in the x-axis direction (the horizontal direction pixel group: group A), and perform the same on the other horizontal direction pixel group $z_1, z_2, z_3$ arrayed in the y-axis direction. The gray value means the value that white is 0, black is 255, and the middle is determined according to the shades. For example, the crack 2 is darker than the other road surface parts, and the gray value of the crack 2 is larger than the gray values of the other parts.

Figure 6:
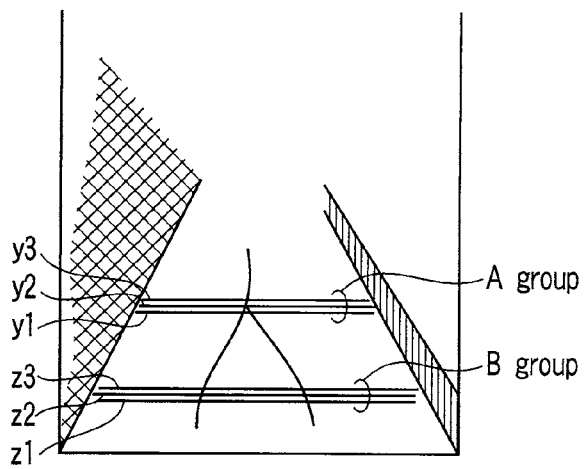
FIG. 6 is a view showing a scanning line according to the same embodiment.

Then, the control unit 13 calculates the edge of each pixel group A and B (FIG. 6) from the calculated gray value (step S3). The edge is defined as a differential of the calculated gray value, and detected at a position where the color tone changes.

Figure 7:
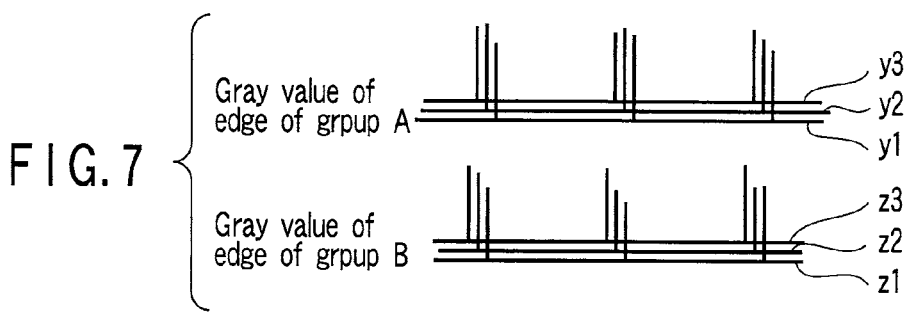
FIG. 7 is a view showing the gray values of the edges of group A and group B according to the same embodiment.

Calculate the absolute gray value (gray value level) at the position where the edge occurs (the detecting position). The edge detecting position on each pixel group $y_1$-$y_3$ of the group A and the gray value at that position are detected by the first gray value detection means 15. The edge detecting position on each pixel group $z_1$-$z_3$ of the group B and the gray value at that position are detected by the second gray value detection means 16. The gray values at the edge detecting positions of the groups A and B are stored in the predetermined memory at every control cycle, as shown in FIG. 7 (step S4). The taken images are edge processed and stored in the image data memory 12b. The control unit 13 is used to perform the above processing in this embodiment, but the image processing unit 12 may be used to perform the processing.

The edge detecting position of the group A and the gray value at that position are stored in the predetermined memory for the next time processing (step S5).

It is possible to calculate the edge detecting position of the group B where the edge detecting position of the group A detected last time, in step S3, displaced by a vehicle speed (a calculation means) (step S6).

The amount of displacing the edge detecting position is corrected according to the vehicle speed, and the edge detecting position of the group A can be certainly shifted to the group B by the calculation even if the vehicle speed is changed.

Figure 8:
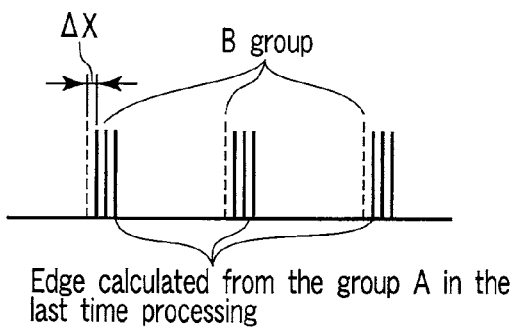
FIG. 8 is a view showing the displacement Δx according to the same embodiment.

Next, compare the edge detecting position, which is displaced by the vehicle speed against the group A in the last time processing by the calculation of step S6, and the gray value at that position with the edge detecting position of the group B and the gray value (a judging means) (step S7). If there is a displacement Δx (FIG. 8) between the edge detecting positions of the groups A and B in step S7, that displacement Δx is recognized as a meandering amount (step S8). Because, if there is meandering, a displacement occurs between the edge detecting position displaced by the vehicle speed against the group A calculated in the last time processing and the edge detecting position of the group B of this time processing. If meandering is detected, a not-shown warning means may warn the driver.

It may be allowed to provide a means for judging whether the average meandering amount calculated in step S8 rises over the reference level, and judge meandering when this judging means judges YES.

The reference level can be obtained by averaging the meandering amount until a certain time passes after the start of driving. Namely, it is judged that the driver has not fallen asleep until a certain time passes after the start of driving, and the meander amount within this certain time is averaged. It is also permitted to seek the reference level experimentally.

The control unit 13 is separated from the image processing unit 12 in this embodiment, but they may be constructed as a single unit.

As explained above, the meandering of a vehicle is judged by detecting the edge detecting position on each pixel group at the position where the road surface image captured by the camera is displaced in the advancing direction. Thus, meandering of vehicle can be judged even if there is no white line on the road surface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle meandering state judging apparatus for a vehicle, comprising:

a camera which continuously captures an image of a road surface along a running direction of the vehicle;

an image processing unit configured to process the image captured by the camera and continuously provide processed images representing the road surface; and a control unit configured to obtain an amount of meandering of the vehicle based on the the processed images, independently of any white line on the road surface, the control unit arranging a first pixel group and a second pixel group arrayed along a horizontal direction over each of the processed images, with the second pixel group positioned at a location different from the first pixel group, wherein the control unit comprises:

a first gray value detection section configured to determine gray values based on each of the processed images along the first pixel group and detect a plurality of reference detecting positions along the first pixel group, independently of any white line on the road surface, based on the gray values;

a second gray value detection section configured to determine gray values based on each of the processed images along the second pixel group and detect the reference detecting positions determined by the first gray value detection section along the second pixel group based on the gray values;

a meandering state detecting section configured to compare the reference detecting positions detected along the second pixel group relative to the reference detecting positions detected along the first pixel group and determine a relative positional shift of the reference detecting positions along the second pixel group to calculate the meandering amount and judge whether the vehicle is in a meandering state based on the calculated meandering amount.

2. The vehicle meandering state judging apparatus according to claim 1, wherein the camera is configured to capture the road surface in front of the vehicle.

3. The vehicle meandering state judging apparatus according to claim 2, wherein the first pixel group is ahead of the second pixel group, and the timing of detecting the gray values of the reference detecting positions detected by the second gray value detection section is changed according to vehicle speed.

4. The vehicle meandering state judging apparatus according to claim 1, wherein the meandering state detecting section judges that the vehicle is in the meandering state when the average value of the meandering amount over a first predetermined period is over a predetermined reference level.

5. The vehicle meandering state judging apparatus according to claim 4, wherein the predetermined reference level represents an average amount of meandering over a second predetermined period after the start of driving.

6. The vehicle meandering state judging apparatus according to claim 1, wherein each of the first and second pixel groups includes a plurality of spaced horizontal reference lines and the reference detecting positions are located on each of the spaced horizontal reference lines.

* * * * *